US012611936B2

(12) United States Patent
Zhang et al.

(10) Patent No.: US 12,611,936 B2
(45) Date of Patent: Apr. 28, 2026

(54) TROLLEY WIRE DETECTION DEVICE AND TROLLEY WIRE DETECTION SYSTEM

(71) Applicant: BEIJING JINGDONG QIANSHI TECHNOLOGY CO., LTD., Beijing (CN)

(72) Inventors: Qiang Zhang, Beijing (CN); Xiaochong Chen, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 590 days.

(21) Appl. No.: 18/004,741

(22) PCT Filed: Apr. 15, 2021

(86) PCT No.: PCT/CN2021/087519
§ 371 (c)(1),
(2) Date: Jan. 9, 2023

(87) PCT Pub. No.: WO2022/052467
PCT Pub. Date: Mar. 17, 2022

(65) Prior Publication Data
US 2023/0256830 A1 Aug. 17, 2023

(30) Foreign Application Priority Data

Sep. 8, 2020 (CN) .......................... 202010936318.6

(51) Int. Cl.
*B60L 5/38* (2006.01)
*B60L 5/04* (2006.01)
*B60M 1/13* (2006.01)

(52) U.S. Cl.
CPC ................ *B60L 5/38* (2013.01); *B60L 5/045* (2013.01); *B60M 1/13* (2013.01)

(58) Field of Classification Search
CPC . B60L 5/38; B60L 5/045; B60M 1/13; B60M 1/28
See application file for complete search history.

(56) References Cited

U.S. PATENT DOCUMENTS 2,193,623 A * 3/1940 Dozler ...................... B60L 7/12
104/296
2,262,413 A * 11/1941 Whittaker ................. B60L 5/32
191/8
(Continued)

FOREIGN PATENT DOCUMENTS

CN 106877230 A * 6/2017 ............. B60M 1/28
CN 107433952 A 12/2017
(Continued)

OTHER PUBLICATIONS

"Decision to Grant a Patent with English language translation", JP Application No. 2022-575434, Sep. 24, 2024, 5 pp.
(Continued)

*Primary Examiner* — Jason C Smith
(74) *Attorney, Agent, or Firm* — Myers Bigel, P.A.

(57) ABSTRACT

The present disclosure relates to a trolley wire detection device and a trolley wire detection system. The trolley wire is disposed on a guide rail and is disposed along an extending direction of the guide rail; the trolley wire detection device includes a current collector assembly connected to the trolley wire; a power mechanism, slidably disposed on the guide rail; and an engagement assembly disposed between the current collector assembly and the power mechanism, the engagement assembly being configured to provide a preset engagement force to connect the current collector assembly and the power mechanism; wherein the power mechanism is configured to drive the current collector assembly to move along the trolley wire through the engagement assembly, and the current collector assembly is con-
(Continued)

300 figured to be disengaged from the power mechanism when a resistance generated by the trolley wire is greater than the preset engagement force.

15 Claims, 5 Drawing Sheets

(56)                 References Cited

U.S. PATENT DOCUMENTS

| | | | | |
|---|---|---|---|---|
| 4,202,273 | A * | 5/1980 | Matsui | B60M 3/04 |
| | | | | 104/298 |
| 6,523,654 | B2 * | 2/2003 | Brooks | B60L 5/00 |
| | | | | 323/215 |
| 9,283,866 | B2 * | 3/2016 | Zimmerman | B60M 1/12 |
| 12,187,139 | B2 * | 1/2025 | Brown | B60L 5/36 |
| 2002/0014383 | A1 * | 2/2002 | Brooks | B60L 5/00 |
| | | | | 191/33 R |
| 2005/0200919 | A1 | 9/2005 | Fukuda | |
| 2016/0090007 | A1 | 3/2016 | Buehs et al. | |
| 2018/0148076 | A1 | 5/2018 | Chien et al. | |
| 2023/0256830 | A1 * | 8/2023 | Zhang | B60M 1/28 |
| | | | | 191/59.1 |

FOREIGN PATENT DOCUMENTS

| | | | | | |
|---|---|---|---|---|---|
| CN | 206914355 | U | * | 1/2018 | |
| CN | 207037460 | U | | 2/2018 | |
| CN | 208931172 | U | | 6/2019 | |
| CN | 209850940 | U | | 12/2019 | |
| CN | 210201122 | U | | 3/2020 | |
| CN | 111217108 | A | * | 6/2020 | B65G 43/00 |
| CN | 111605572 | A | * | 9/2020 | B60M 1/28 |
| CN | 112297957 | A | | 2/2021 | |
| CN | 212637225 | U | * | 3/2021 | |
| DE | 102014219466 | A1 | | 3/2016 | |
| EP | 3225452 | B1 | * | 6/2021 | H02J 7/0045 |
| JP | H0554058 | A | | 3/1993 | |
| JP | H0577663 | A | * | 3/1993 | |
| JP | H0585233 | A | | 4/1993 | |
| JP | H06303701 | A | * | 10/1994 | |
| JP | 2024521481 | A | * | 5/2024 | B60M 1/30 |
| WO | WO-2023127841 | A1 | * | 7/2023 | B60L 50/40 |

OTHER PUBLICATIONS

"International Search Report and Written Opinion of the International Searching Authority with English language translation", International Application No. PCT/CN2021/087519, Jul. 15, 2021, 19 pp.
"Notification to Grant Patent Right for Invention with English language translation", CN Application No. 202010936318.6, Sep. 28, 2021, 6 pp.

* cited by examiner

TROLLEY WIRE DETECTION DEVICE AND TROLLEY WIRE DETECTION SYSTEM

CROSS-REFERENCE TO RELATED APPLICATIONS

This disclosure is a U.S. National Stage Application under 35 U.S.C. § 371 of International Patent Application No. PCT/CN2021/087519, filed on Apr. 15, 2021, which is based on and claims priority to Chinese Patent Application No. 202010936318.6, filed on Sep. 8, 2020, which is hereby incorporated by reference in its entirety.

TECHNICAL FIELD

The present disclosure relates to the field of detection systems, and in particular to a trolley wire detection device and a trolley wire detection system.

BACKGROUND

The trolley wire for power supply is installed on the frame body of work sites used for a shuttle car, etc. After installation of the trolley wire is completed, it is necessary to detect whether the installation of the trolley wire meets requirements. Whether a current collector has phenomena such as deviation and jamming when operating in the trolley wire in a plugged state is mainly detected, so as to repair the defects generated during the installation of the trolley wire in time. The detection in related art is mainly completed by manpower, that is, the current collector hand-held by manpower cooperates with movement of the trolley wire to detect whether there are defects in the operation process. Manual detection of the trolley wire consumes a lot of labor and time, and there are great safety hazards during detection of high-rise frame bodies.

SUMMARY

Some embodiments of the present disclosure provide a trolley wire detection device, wherein a trolley wire is disposed on a guide rail and is disposed along an extending direction of the guide rail, wherein the trolley wire detection device includes:

a current collector assembly connected to the trolley wire;
a power mechanism slidably disposed on the guide rail; and
an engagement assembly disposed between the current collector assembly and the power mechanism, wherein the engagement assembly is configured to provide a preset engagement force, so that the current collector assembly is connected to the power mechanism;
wherein the power mechanism is configured to drive the current collector assembly to move along the trolley wire through the engagement assembly, and the current collector assembly is configured to be disengaged from the power mechanism when a resistance generated by the trolley wire is greater than the preset engagement force.

In some embodiments, the power mechanism includes:
a mounting seat; and
driving wheels disposed on the mounting seat, the driving wheels in contact with the guide rail and configured to roll along the guide rail to drive the mounting seat to move along the guide rail.

In some embodiments, the power mechanism further includes driven wheels, the driven wheels are disposed on the mounting seat, and the driven wheels are in contact with the guide rail, and are driven by the mounting seat to roll along the guide rail.

In some embodiments, the driving wheels are disposed on an outer side of the guide rail, the driven wheels are disposed on an inner side of the guide rail, and the driven wheels and the driving wheels are configured to cooperate to clamp the guide rail.

In some embodiments, the guide rail includes a top wall, the driving wheels are disposed on an outer side of the top wall, and the driven wheels are disposed on an inner side of the top wall.

In some embodiments, the mounting seat includes:
a first mounting member located on an outer side of the guide rail, the driving wheels being disposed on the first mounting member:
a second mounting member, including a first part located on the outer side of the guide rail, and a second part located on an inner side of the guide rail, the driven wheels being disposed on the second part; and
a connecting assembly connected to the first mounting member and the first part, the connecting assembly being configured to adjust a gap between the first mounting member and the first part.
In some embodiments, the connecting assembly includes:
screw rods, first ends thereof being threadedly connected to the first part, and second ends thereof penetrating the first mounting member:
springs sleeving the second ends of the screw rods; and
nuts threadedly connected to the second ends of the screw rods to compress the springs between the nuts and the first mounting member.
In some embodiments, the power mechanism further includes guide wheels, and the guide wheels are disposed on the mounting seat, are in contact with the guide rail, and are driven by the mounting seat to roll along the guide rail.
In some embodiments, the guide wheels include:
first guide wheels disposed on the inner side of the guide rail; and
second guide wheels disposed on the outer side of the guide rail: the second guide wheels and the first guide wheels being configured to cooperate to clamp the guide rail.
In some embodiments, the driving wheels include a first driving wheel and a second driving wheel, two first guide wheels are disposed, and two second guide wheels are disposed: a central axis of the first driving wheel is perpendicular to and coplanar with a central axis of one of the first guide wheels; a central axis of the second driving wheel is perpendicular to and coplanar with a central axis of the other first guide wheel; and the two first guide wheels and the two second guide wheels are located in the same plane.
In some embodiments, the guide rail includes a top wall and a side wall connected to the top wall, the power mechanism further includes driven wheels, the driven wheels are disposed on the mounting seat, and the driven wheels are in contact with the guide rail, and are driven by the mounting seat to roll along the guide rail: the driving wheels and the driven wheels are configured to clamp the top wall of the guide rail, and the first guide wheels and the second guide wheels are configured to clamp the side wall of the guide rail.
In some embodiments, axes of the guide wheels are perpendicular to axes of the driving wheels.
In some embodiments, the engagement assembly includes magnetic assemblies which are attracted to each other and disposed on the current collector assembly and the power mechanism, or includes elastic snap-fit assemblies which are connected to each other in a snap-fit manner and disposed on the current collector assembly and the power mechanism.

In some embodiments, the current collector assembly includes a current collector body and a connecting member, the connecting member is connected to the current collector body, and the connecting member is also connected to the power mechanism through the engagement assembly.

Some embodiments of the present disclosure provide a trolley wire detection system, including a trolley wire, a guide rail and the above trolley wire detection device, the trolley wire being disposed on the guide rail and disposed along an extending direction of the guide rail.

Based on the above technical solutions, the present disclosure at least has the following beneficial effects:

In some embodiments, the trolley wire detection device includes the current collector assembly, the power mechanism and the engagement assembly, the current collector assembly and the power mechanism are connected by the preset engagement force provided by the engagement assembly, before detection, the trolley wire detection device is disposed at one of end parts of the guide rail, and during detection, the current collector assembly is driven by the power mechanism to move along the trolley wire: when the trolley wire meets installation requirements, the trolley wire detection device will operate smoothly from one end of the guide rail to the other end of the guide rail: when the trolley wire has defects such as deformation and offset, the trolley wire produces a resistance to the current collector assembly, and when the resistance generated by the trolley wire to the current collector assembly is greater than the preset engagement force, the current collector assembly is disengaged from the power mechanism, which indicates that the defect exists in the installation of the trolley wire; and the position where the current collector assembly is disengaged from the power mechanism is the position of the defect in the installation of the trolley wire, and the position where the trolley wire has the installation defect can be conveniently, quickly and accurately found. The trolley wire detection device is convenient to operate, has high detection efficiency, and can greatly reduce labor costs and construction safety risks.

BRIEF DESCRIPTION OF THE DRAWINGS

The accompanying drawings described herein are used to provide a further understanding of the present disclosure and form a part of the present application. The exemplary embodiments of the present disclosure and their descriptions are used to explain the present disclosure and do not form an improper limitation to the present disclosure. In the drawings.

DETAILED DESCRIPTION OF THE EMBODIMENTS

Figure 1:
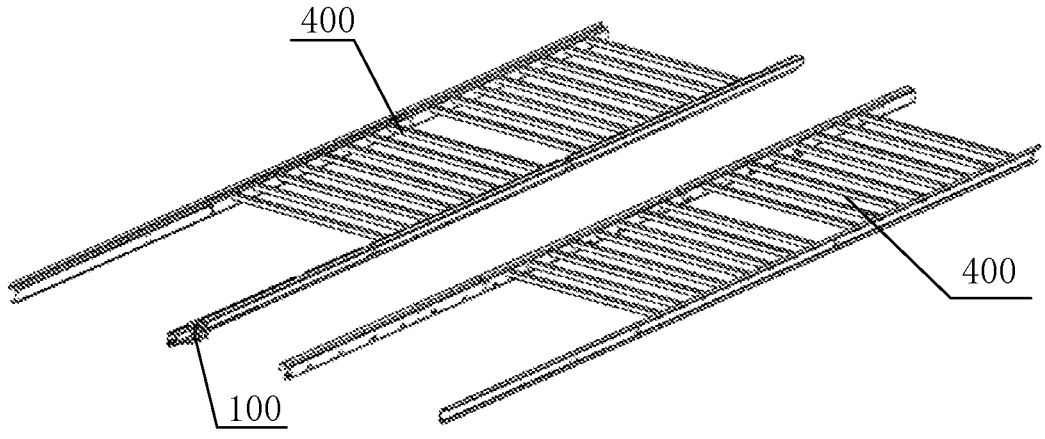
FIG. 1 is a schematic diagram of a trolley wire detection device disposed on a frame body where a trolley wire is located according to some embodiments of the present disclosure.

The technical solutions in the embodiments will be clearly and completely described below in combination with the accompanying drawings in the embodiments of the present disclosure. Obviously, the described embodiments are only a part but not all of the embodiments of the present disclosure. Based on the embodiments of the present disclosure, all other embodiments obtained by those ordinary skilled in the art without creative work are within the protection scope of the present disclosure.

In the description of the present disclosure, it should be understood that the orientation or positional relationships indicated by terms such as "center", "longitudinal", "lateral", "front", "rear", "left", "right", "vertical", "horizontal", "top", "bottom", "inner" and "outer" are based on the orientation or positional relationships shown in the drawings, only for the purposes of the ease in describing the present disclosure and simplification of its descriptions, but not indicating or implying that the specified device or element must be specifically located, and structured and operated in a specific direction, and therefore, should not be understood as limitations to the protective scope of the present disclosure.

An electric-driven mobile device, such as a shuttle car, constantly changes the position when moving on a frame body 400. At each different position, the shuttle car (mobile device) has to obtain a power supply at any time, otherwise it cannot continue to move.

The frame body 400 includes a guide rail 300. The guide rail 300 is provided with a trolley wire 200 therein. The trolley wire 200 is disposed along an extending direction of the guide rail 300. The trolley wire 200 is powered on, and a current collector that can take electricity from the trolley wire 200 is disposed on the mobile device. In this way, when the mobile device moves, the current collector operates synchronously with the mobile device, obtains the power supply from the trolley wire 200 at any time, and supplies the same to the mobile device, so that the mobile device can continue to move.

After installation of the trolley wire 200 is completed, it is necessary to detect whether the installation of the trolley wire 200 meets requirements. Whether the current collector has phenomena such as deviation and jamming when operating in the trolley wire 200 in a plugged state is mainly detected, so as to repair the defects generated during the installation of the trolley wire 200 in time.

Some embodiments of the present disclosure provide a trolley wire detection device and a trolley wire detection system, which are adopted to alleviate the problem of labor and time waste in detection of the trolley wire.

In some embodiments, the trolley wire detection device 100 is used to detect whether the installation of the trolley wire 200 meets the requirements.

Figure 2:
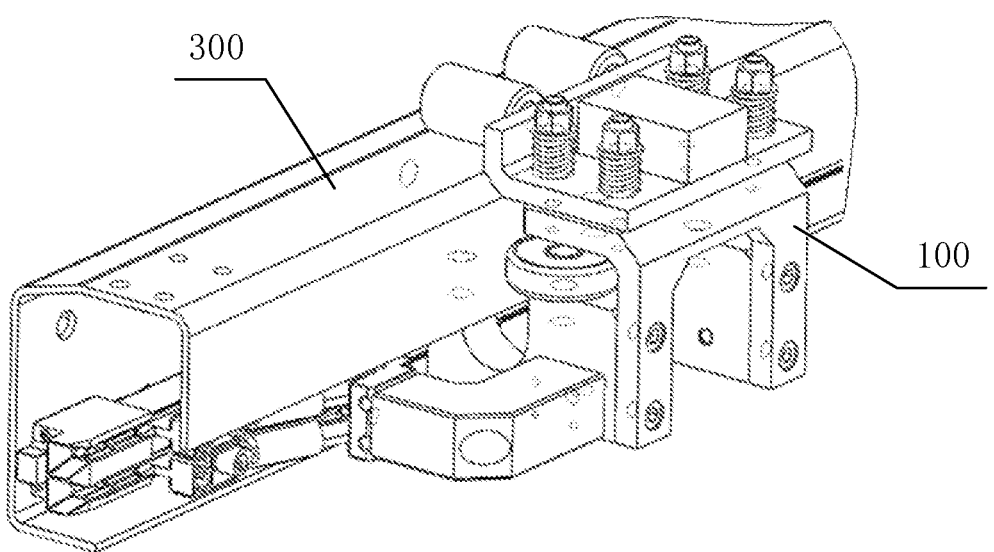
FIG. 2 is a partially enlarged schematic diagram of a trolley wire detection device disposed on a frame body where a trolley wire is located according to some embodiments of the present disclosure.
Figure 3:
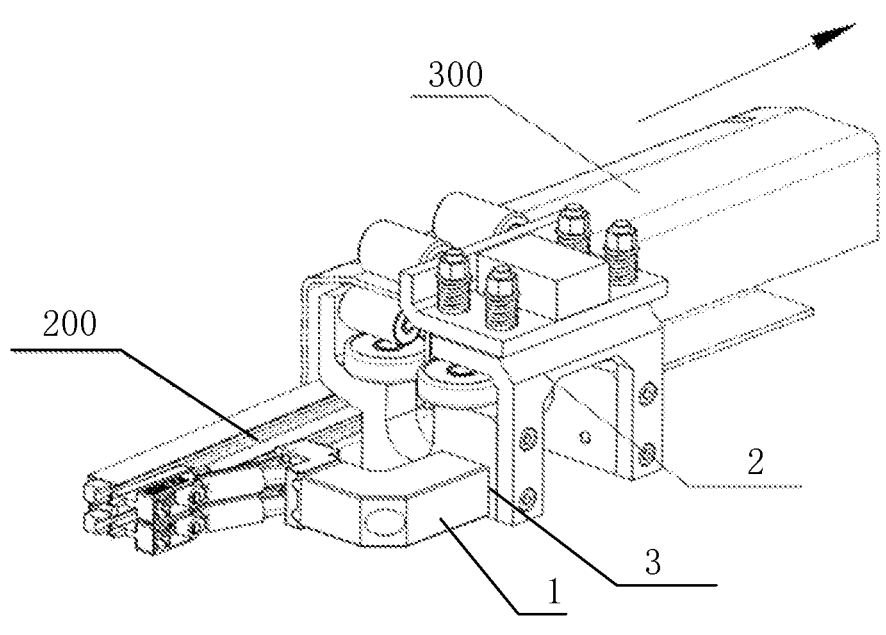
FIG. 3 is a schematic structural diagram of a trolley wire detection device according to some embodiments of the present disclosure.

As shown in FIG. 1 to FIG. 3, the frame body 400 includes the guide rail 300. The guide rail 300 is provided with the trolley wire 200 therein, and the trolley wire 200 is disposed along an extending direction of the guide rail 300. When it is necessary to detect whether the installation of the trolley wire 200 meets the requirements, the trolley wire detection device 100 is disposed on one of end parts of the guide rail 300 (as shown in FIG. 1). When the trolley wire 200 meets the installation requirements, the trolley wire detection device 100 operates smoothly from one end to the other end of the guide rail 300; when the trolley wire 200 has defects such as deformation and offset, the trolley wire 200 generates a resistance to a current collector assembly 11. The operation of a current collector brush is no longer smooth, and has the phenomena such as jamming or deviation. Therefore, the installation defects of the trolley wire can be efficiently detected.

As shown in FIG. 3, in some embodiments, the trolley wire detection device 100 includes a current collector assembly 1, a power mechanism 2 and an engagement assembly 3.

The current collector assembly 1 is connected to the trolley wire 200 to take electricity from the trolley wire 200.

The power mechanism 2 is slidably disposed on the guide rail 300. Optionally, power of the power mechanism 2 includes electric power, hydraulic power or the like. The electric power of the power mechanism 2 is not obtained from the trolley wire.

The engagement assembly 3 is disposed between the current collector assembly 1 and the power mechanism 2, and the engagement assembly 3 is configured to provide a preset engagement force to connect the current collector assembly 1 to the power mechanism 2.

Figure 9:
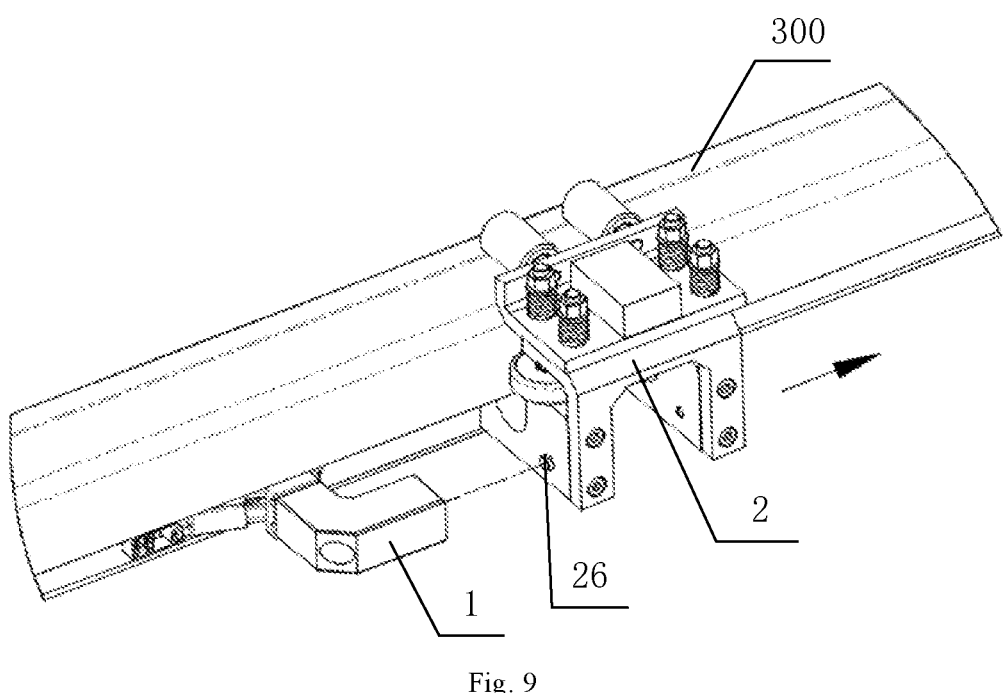
FIG. 9 is a schematic diagram of a current collector assembly disengaged from a power mechanism during working of a trolley wire detection device according to some embodiments of the present disclosure.

The power mechanism 2 is configured to drive the current collector assembly 1 to move along the trolley wire 200 after being connected to the current collector assembly 1 through the preset engagement force provided by the engagement assembly 3, and the current collector assembly 1 is configured to be disengaged from the power mechanism 2 when the resistance generated by the trolley wire 200 is greater than the preset engagement force, as shown in FIG. 9.

In order to improve detection efficiency of the trolley wire, the present disclosure provides a trolley wire detection device 100, which includes the current collector assembly 1, the power mechanism 2 and the engagement assembly 3, and the current collector assembly 1 and the power mechanism 2 are connected by the preset engagement force provided by the engagement assembly 3. Before detection, the trolley wire detection device 100 is disposed on one of end parts of the guide rail 300, and during detection, the current collector assembly 1 is driven by the power mechanism 2 to move along the trolley wire 200.

When the trolley wire 200 meets the installation requirements, the trolley wire detection device 100 will operate smoothly from one end to the other end of the guide rail 300; when the trolley wire 200 has defects such as deformation and offset, the trolley wire 200 generates a resistance to the current collector assembly 1, and the operation of the current collector brush is no longer smooth, and has the phenomena such as jamming or deviation. When the resistance generated by the trolley wire 200 to the current collector assembly 1 is greater than the preset engagement force, the current collector assembly 1 is disengaged from the power mechanism 2. The position where the current collector assembly 1 is disengaged from the power mechanism 2 is the position of the defect in installation of the trolley wire 200. The trolley wire detection device 100 according to the embodiments of the present disclosure is small in size and good in portability, and can improve the detection efficiency after the trolley wire 200 is installed, reduce labor costs, and reduce construction safety risks. Furthermore, the speed at which the power mechanism 2 drives the current collector assembly 1 to move along the trolley wire 200 is adjustable, which can highly restore actual working conditions.

Figure 4:
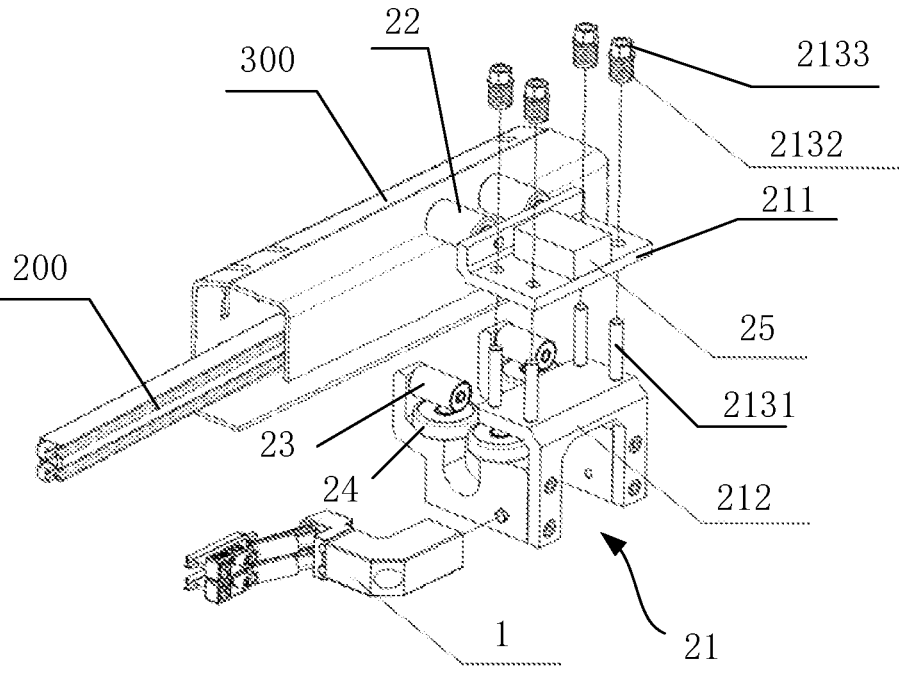
FIG. 4 is an exploded schematic diagram of a trolley wire detection device according to some embodiments of the present disclosure.

In some embodiments, as shown in FIG. 4, the power mechanism 2 includes a mounting seat 21 and driving wheels 22. The driving wheels 22 are disposed on the mounting seat 21, and the driving wheels 22 are in contact with the guide rail 300 and configured to roll along the guide rail 300 to drive the mounting seat 21 to move along the guide rail 300. When the driving wheels 22 rotate, the mounting seat 21 drags the current collector assembly 1 to move along the guide rail 300 at a set speed.

Optionally, the driving wheel 22 includes an in-wheel motor. The in-wheel motor is adopted as the driving wheel.

Optionally, the driving wheel 22 includes a roller and a motor.

In some embodiments, the power mechanism 2 further includes driven wheels 23. The driven wheels 23 are disposed on the mounting seat 21. The driven wheels 23 are in contact with the guide rail 300 and are driven by the mounting seat 21 to roll along the guide rail 300.

In some embodiments, the power mechanism 2 includes the mounting seat 21, the driving wheels 22 and the driven wheels 23.

The driving wheels 22 are disposed on the mounting seat 21 and are located on the outer side of the guide rail 300. The driving wheels 22 are in contact with the outer wall of the guide rail 300 and configured to roll along the guide rail 300 to drive the mounting seat 21 to move along the guide rail 300.

The driven wheels 23 are disposed on the mounting seat 21 and located on the inner side of the guide rail 300. The driven wheels 23 are in contact with the inner wall of the guide rail 300, and are driven by the mounting seat 21 to roll along the guide rail 300.

In some embodiments, as shown in FIG. 4, the power mechanism 2 includes a control box 25, the control box 25 is disposed on the mounting seat 21, and the control box 25 is internally provided with a battery for providing power to the driving wheels 22, a controller for controlling start, stop and rotation speeds of the driving wheels 22, and the like.

In some embodiments, the driving wheels 22 are disposed on the outer side of the guide rail 300, the driven wheels 23 are disposed on the inner side of the guide rail 300, and the driven wheels 23 and the driving wheels 22 are configured to cooperate to clamp the guide rail 300.

Optionally, positions of the driven wheels 23 are aligned with positions of the driving wheels 22, and the driven wheels 23 cooperate with the driving wheels 22 to clamp the guide rail 300.

In some embodiments, the guide rail 300 includes a top wall, the driving wheels 22 are disposed on the outer side of the top wall, and the driven wheels 23 are disposed on the inner side of the top wall.

Figure 5:
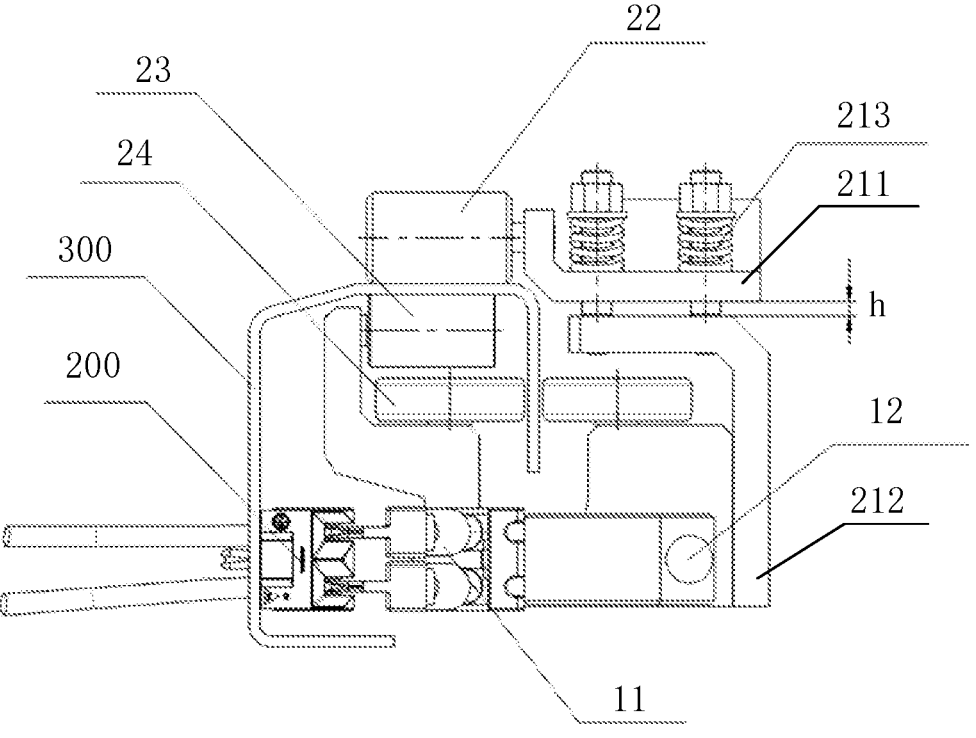
FIG. 5 is a schematic diagram of a trolley wire detection device in a working state according to some embodiments of the present disclosure.

The top wall of the guide rail 300 here is shown as the top of the guide rail 300 according to FIG. 3 to FIG. 5. When the guide rail 300 is not disposed in the orientation shown in FIG. 3 to FIG. 5, the top wall of the guide rail 300 may also be the side part or bottom of the guide rail 300.

In some embodiments, as shown in FIG. 5, the mounting seat 21 includes a first mounting member 211, the first mounting member 211 is located on the outer side of the guide rail 300, and the driving wheels 22 are disposed on the first mounting member 211.

The mounting seat 21 further includes a second mounting member 212, the second mounting member 212 includes a first part located on the outer side of the guide rail 300, and a second part located on the inner side of the guide rail 300, and the driven wheels 23 are disposed on the second part.

The mounting seat 21 further includes a connecting assembly 213, the connecting assembly 213 is connected to the first mounting member 211 and the first part of the second mounting member 212, and the connecting assembly 213 is configured to adjust a gap h between the first mounting member 211 and the first part, as shown in FIG. 5.

Figure 7:
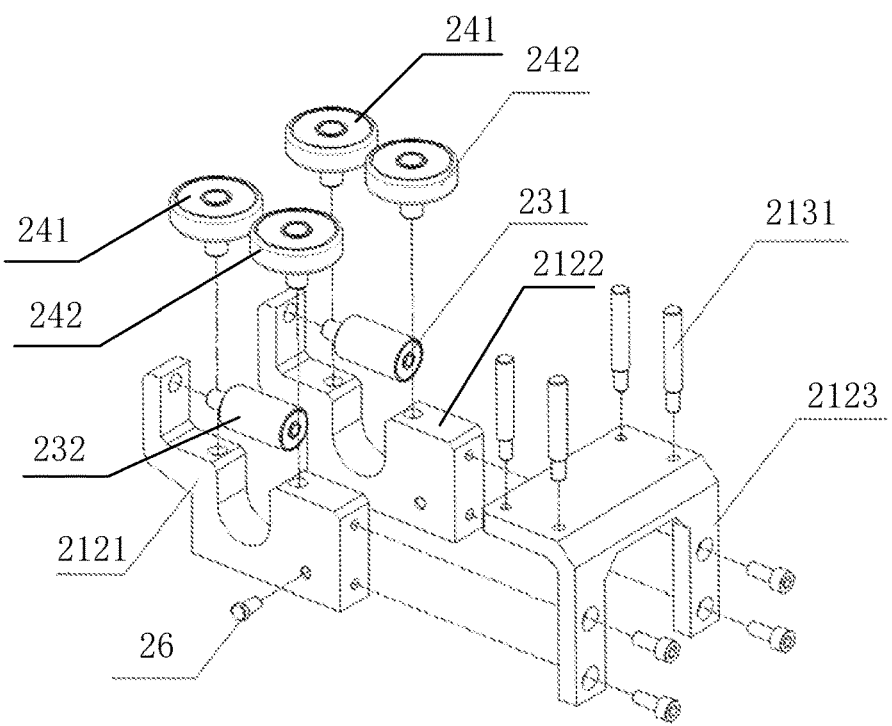
FIG. 7 is an exploded schematic diagram of a driven assembly of a trolley wire detection device according to some embodiments of the present disclosure.

In some embodiments, as shown in FIG. 5 and FIG. 7, the connecting assembly 213 includes screw rods 2131, first ends of the screw rods 2131 are threadedly connected to the first part of the second mounting member 212, and second ends of the screw rods 2131 penetrate the first mounting member 211. That is to say, the first mounting member 211 is provided with through holes, the screw rods 2131 penetrate the through holes, and the screw rods 2131 may move relative to the first mounting member 211.

The connecting assembly 213 further includes springs 2132, and the springs 2132 sleeve the second ends of the screw rods 2131.

The connecting assembly 213 further includes nuts 2133, and the nuts 2133 are threadedly connected to the second ends of the screw rods 2131 to compress the springs 2132 between the nuts 2133 and the first mounting member 211.

Before working, by rotating the nuts 2133 to compress the springs 2132, the springs 2132 are compressed and extrude the first mounting member 211, so that the first mounting member 211 is deformed to approach the second mounting member 212. At this time, the screw rods 2131 play a guide role, and the gap h between the first mounting member 211 and the first part of the second mounting member 212 is accordingly adjusted, so that the driving wheels 22 on the first mounting member 211 and the driven wheel 23 on the second part of the second mounting member 212 can clamp the guide rail 300 to maintain a sufficient contact frictional force, and the driving wheels 22 and the driven wheels 23 can roll along the guide rail 300.

In some embodiments, the power mechanism 2 further includes guide wheels 24. The guide wheels 24 are disposed on the mounting seat 21. The guide wheels 24 are in contact with the guide rail 300 and are driven by the mounting seat 21 to roll along the guide rail 300. The guide wheels 24 may be located on the inner side or outer side of the guide rail 300. The guide wheels 24 are adopted to guide the operation of the entire device.

In some embodiments, as shown in FIG. 5 and FIG. 7, the guide wheels 24 include first guide wheels 241, and the first guide wheels 241 are disposed on the inner side of the guide rail 300.

The guide wheels 24 further include second guide wheels 242, and the second guide wheels 242 are disposed on the outer side of the guide rail 300; the second guide wheels 242 cooperate with the first guide wheels 241 to clamp the guide rail 300.

Optionally, positions of the second guide wheels 242 are aligned with positions of the first guide wheels 241.

In some embodiments, the driving wheels 22, the driven wheels 23 and the first guide wheels 241 are disposed in sequence, and aligned in position, and the driven wheels 23 are located between the driving wheels 22 and the first guide wheels 241.

In some embodiments, the driving wheels 22 include a first driving wheel 221 and a second driving wheel 222, the number of the first guide wheels 241 is two, and the number of the second guide wheels 242 is two; a central axis of the first driving wheel 221 is perpendicular to and coplanar with a central axis of one of the first guide wheels 241; a central axis of the second driving wheel 222 is perpendicular to and coplanar with a central axis of the other first guide wheel 241; and the two first guide wheels 241 and the two second guide wheels 242 are located in the same plane.

In some embodiments, the driving wheels 22 include the first driving wheel 221 and the second driving wheel 222, the driven wheels 23 include a first driven wheel 231 and a second driven wheel 232, the number of the first guide wheels 241 is two, and the number of the second guide wheels 242 is two. The central axis of the first driving wheel 221, a central axis of the first driven wheel 231 and the central axis of one of the first guide wheels 241 are coplanar; the central axis of the second driving wheel 222, a central axis of the second driven wheel 232 and the central axis of the other first guide wheel 241 are coplanar; and the two first guide wheels 241 and the two second guide wheels 242 are located in the same plane.

The driving wheels 22 and the driven wheels 23 are respectively in contact with two surfaces of the guide rail 300 under an action of the compression springs 2132, and clamp the guide rail 300, and the driving wheels 22 and the driven wheels 23 roll along the guide rail 300; and the two first guide wheels 241 on the inner side of the guide rail 300 and the two second guide wheels 242 on the outer side of the guide rail 300 cooperate with each other to clamp the guide rail 300. The guide wheels 24 are adopted to guide the operation of the entire detection device along the guide rail 300, which is beneficial for operation stability of the entire detection device.

In some embodiments, the guide rail 300 includes a top wall and a side wall connected to the top wall, the driving wheels 22 and the driven wheels 23 clamp the top wall of the guide rail 300, and the first guide wheels 241 and the second guide wheels 242 clamp the side wall of the guide rail 300.

In some embodiments, axes of the driving wheels 22 are parallel to axes of the driven wheels 23. Axes of the guide wheels 24 are perpendicular to the axes of the driving wheels 22.

Optionally, the driving wheels 22 and the driven wheels 23 are all located on the same side of the guide wheels 24. For example, the driving wheels 22 and the driven wheels 23 are all located above the guide wheels 24, as shown in FIG. 5.

In some embodiments, the engagement assembly 3 includes magnetic assemblies 31 which are attracted to each other and disposed on the current collector assembly 1 and the power mechanism 2.

Optionally, the magnetic assemblies 31 include magnets disposed on the current collector assembly 1, and also include the iron mounting seat 21 of the power mechanism 2. Further, the second mounting member 212 of the mounting seat 21 is made of metal iron. The current collector assembly 1 and the power mechanism 2 are connected together by an attraction force of the magnets attracting the iron. When a frictional resistance between the trolley wire 200 and the current collector assembly 1 exceeds the attraction force of the magnets, the current collector assembly 1 is disengaged from the power mechanism 2, as shown in FIG. 9. The disengagement position between the current collector assembly 1 and the power mechanism 2 is the position of the defect in installation of the trolley wire.

The magnets include neodymium magnets.

Optionally, the magnetic assemblies 31 include electromagnets disposed at the current collector assembly 1 and the power mechanism 2. By using the electromagnets instead of neodymium magnets, the electromagnets can adjust a magnetic force according to different speeds to adapt to different disengagement pull forces.

In some embodiments, the engagement assembly 3 includes elastic snap-fit assemblies which are connected to each other in a snap-fit manner and disposed on the current collector assembly 1 and the power mechanism 2.

Optionally, the elastic snap-fit assembly includes an elastic member disposed on the current collector assembly 1 and an elastic member disposed on the power mechanism 2. The two elastic members are snap-fitted together through limiting tables disposed on the elastic members. When the frictional resistance between the trolley wire 200 and the current collector assembly 1 is greater than a snap-fit force of the limiting tables on the two elastic members, the elastic members are deformed, and the current collector assembly 1 is disengaged from the power mechanism 2, referring to FIG. 9.

Figure 8:
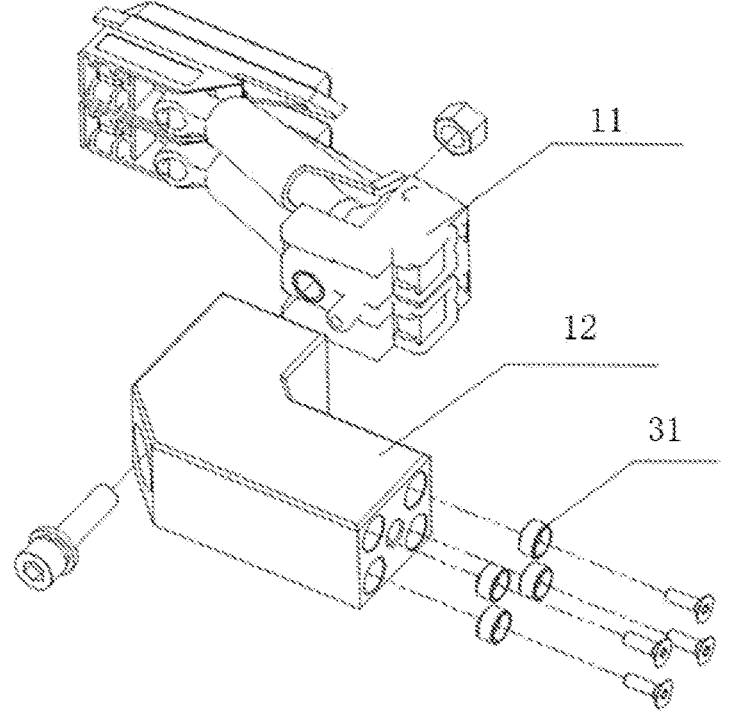
FIG. 8 is a schematic diagram of a current collector assembly of a trolley wire detection device according to some embodiments of the present disclosure.

In some embodiments, as shown in FIG. 8, the current collector assembly 1 includes a current collector body 11 and a connecting member 12, the connecting member 12 is connected to the current collector body 11, and the connecting member 12 is connected to the power mechanism 2 through the engagement assembly 3.

As shown in FIG. 4, in some specific embodiments of the trolley wire detection device, the trolley wire detection device includes two driving wheels 22, two driven wheels 23, two first guide wheels 241, and two second guide wheels 242. The mounting seat 21 includes the first mounting member 211 and the second mounting member 212.

As shown in FIG. 5, the two driving wheels 22 are disposed on the first mounting member 211 and are located on the outer side of the guide rail 300, the two driven wheels 23 are disposed on the second mounting member 212 and are located on the inner side of the guide rail 300, and the two driving wheels 22 and the two driven wheels 23 cooperate to clamp the top wall of the guide rail 300.

The two first guide wheels 241 are disposed on the inner side of the guide rail 300 and located below the driven wheels 23, the two second guide wheels 242 are disposed on the outer side of the guide rail 300, and the two first guide wheels 241 and the two second guide wheels 242 cooperate to clamp the side walls of the guide rail 300. The central axes of the driving wheels 22 are parallel to the central axes of the driven wheels 23, the central axes of the first guide wheels 241 are parallel to the central axes of the second guide wheels 242, and the central axes of the driving wheels 22 are perpendicular to the central axes of the guide wheels 24.

The two driving wheels 22 are located in the same plane. The two driven wheels 23 are located in the same plane. The two first guide wheels 241 and the two second guide wheels 242 are located in the same plane.

Figure 6:
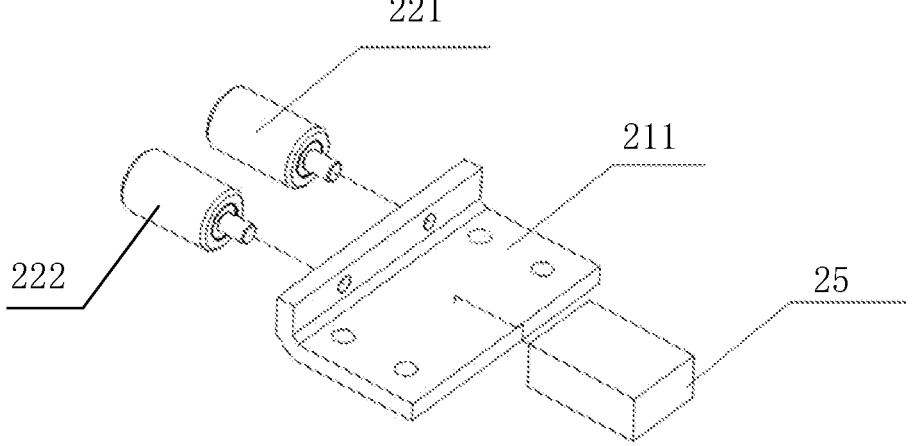
FIG. 6 is an exploded schematic diagram of a driving assembly of a trolley wire detection device according to some embodiments of the present disclosure.

FIG. 6 shows a driving assembly, including the driving wheels 22, the first mounting member 211 and the control box 25. The first mounting member 211 is an L-shaped plate. The two driving wheels 22 are disposed on a vertical plate of the L-shaped first mounting member 211, and the control box 25 is disposed on a lateral plate of the first mounting member 211. The lateral plate of the first mounting member 211 is provided with the through holes for the bolts 2131 to penetrate.

FIG. 7 shows a driven assembly, including the second mounting member 212, the first driven wheel 231, the second driven wheel 232, the two first guide wheels 241 and the two second guide wheels 242. The second mounting member 212 includes a first bracket 2121, a second bracket 2122 and a connecting plate 2123, the first bracket 2121 and the second bracket 2122 are disposed side by side at intervals, and the connecting plate 2123 is connected to the first bracket 2121 and the second bracket 2122.

The structures of the first bracket 2121 and the second bracket 2122 are the same, and the first bracket 2121 is taken as an example for description. The first bracket 2121 includes a first mounting part and a second mounting part, and the first mounting part is provided with the first guide wheels 241 and the second guide wheels 242 at intervals. The first guide wheels 241 and the second guide wheels 242 are located in the same plane. Optionally, the first mounting part is provided with a U-shaped groove, and the U-shaped groove is located between the first guide wheels 241 and the second guide wheels 242.

First ends of the second mounting parts are connected to the first mounting parts, second ends of the second mounting parts extend upward, and the driven wheels 23 are mounted on the second mounting parts. The driven wheels 23 are located above the first guide wheels 241. The driven wheels 23 and the first guide wheels 241 are located on the inner side of the guide rail 300. The second guide wheels 242 are located on the outer side of the guide rail 200.

The connecting plate 2123 is L-shaped, a vertical side of the connecting plate 2123 is connected to the first bracket 2121 and the second bracket 2122 respectively, and a lateral side of the connecting plate 2123 is located above the second guide wheels 242. The first ends of the screw rods 2131 are threadedly connected to the lateral side of the connecting plate 2123 (the first part of the second mounting member 212), the second ends of the screw rods 2131 penetrate the first mounting member 211, the second ends of the screw rods 2131 are provided with the springs 2132 in a sleeving manner and are threadedly connected to the nuts 2133, and the nuts 2133 compress the springs 2132 between the nuts 2133 and the first mounting member 211. The distance h between the lateral side of the connecting plate 2123 and the lateral plate of the first mounting member 211 is adjusted by rotating the nuts 2133, as shown in FIG. 5.

As shown in FIG. 8, the current collector assembly 1 includes the current collector body 11 and the connecting member 12, the connecting member 12 is L-shaped, a first end of the connecting member 12 is connected to the current collector body 11, the middle of a second end of the connecting member 12 is provided with a positioning hole, and four magnets are disposed in a circumferential direction of the positioning hole. According to different types of trolley wires, the magnetic force or the number of the adopted magnets can be changed.

As shown in FIG. 9, the first bracket 2121 is made of metal iron, and the magnets on the connecting member 12 are adopted to attract the first bracket 2121 to combine the current collector assembly 1 and the power mechanism 2 together. The first bracket 2121 is provided with a positioning member 26, and the positioning member 26 cooperates with the positioning hole disposed in the second end of the connecting member 12 (as shown in FIG. 8) for positioning the connecting member 12 and the first bracket 2121.

Optionally, the positioning member 26 includes a positioning pin. The positioning pin is fixed on the iron first bracket 2121 and is adopted to cooperate with the positioning hole in the connecting member 12 of the current collector assembly 1 to play a positioning role, as shown in FIG. 7 and FIG. 8.

In some embodiments, the trolley wire detection device further includes a sensor, the sensor is disposed at the power mechanism 2, and the sensor is adopted to collect and record the sound in a running-in process (including an abnormal sound of the current collector, the deceleration caused by local narrowing of an acceleration trolley wire slide way and other parameters), so as to process the defects of the trolley wire in time.

Some embodiments also provide a trolley wire detection system, including the trolley wire 200, the guide rail 300 and the above trolley wire detection device. The trolley wire 200 is disposed on the guide rail 300 and disposed along an extending direction of the guide rail 300.

In some embodiments, as shown in FIG. 5, the guide rail 300 includes the top wall, a bottom wall, a first side wall connected to the top wall and the bottom wall, and a second side wall with one end connected to the top wall and the other end suspended in air. The guide rail 300 forms a cavity for accommodating the trolley wire 200 by the top wall, the bottom wall, the first side wall and the second side wall, and there is a gap between the second side wall and the bottom wall, so as to facilitate the connection between the current collector assembly 1 and the trolley wire 200, and to facilitate walking of the current collector assembly 1 along the trolley wire 200. Of course, the shape and structure of the guide rail 300 are not limited thereto.

The orientation or positional relationship indicated by the "top" and "bottom" in the top wall and the bottom wall is based on the orientation or positional relationship shown in FIG. 5, only for the purposes of the ease in describing the embodiment and simplification of its descriptions, but not indicating or implying that the specified device or element must have the specific orientation or position.

In some embodiments, the driving wheels 22 and the driven wheels 23 in the trolley wire detection device cooperate to clamp the top wall of the guide rail 300, and the first guide wheels 241 and the second guide wheels 242 cooperate to clamp the second side wall of the guide rail 300.

The inner side of the guide rail 300 refers to the inside of the cavity of the guide rail, and the outer side of the guide rail 300 refers to the outer side of the cavity of the guide rail. The driving wheels 22 are located on the outer side of the guide rail 300, the driven wheels 23 are located on the inner side of the guide rail 300, the first guide wheels 241 are located on the inner side of the guide rail 300, and the second guide wheels 242 are located on the outer side of the guide rail 300.

In some embodiments, a length of the guide rail is 78 meters, the highest position of the guide rail is 8.5 meters, and the frame body has 16 layers in total. Alternatively, the length of the trolley wire installed on the frame body is about 30 meters to 100 meters, and the height is about 5 meters to 10 meters. The trolley wire detection device according to the present disclosure is adopted to detect the installation of the trolley wire, which can improve the detection efficiency after the trolley wire 200 is installed, reduce labor costs, and reduce construction safety risks. Furthermore, the speed at which the power mechanism 2 drives the current collector assembly 1 to move along the trolley wire 200 is adjustable, which can highly restore the actual working conditions.

In the description of the present disclosure, it should be understood that the use of words such as "first", "second" and "third" to define the assemblies is only for the convenience of distinguishing the above assemblies, and unless otherwise stated, the above words have no special meaning, and therefore cannot be construed as limiting the protection scope of the present disclosure.

In addition, the technical features of one of the embodiments can be beneficially combined with one or more other embodiments, unless explicitly denied.

Finally, it should be noted that the above embodiments are only used for illustrating rather than limiting the technical solutions of the present disclosure: although the present disclosure has been described in detail with reference to the preferred embodiments, those of ordinary skill in the art should understand that modifications can still be made to the specific embodiments of the present disclosure or equivalent substitutions can be made to part of technical features; and without departing from the spirit of the technical solutions of the present disclosure, the modifications and equivalent substitutions should be included in the scope of the technical solutions claimed in the present disclosure.

The invention claimed is:

1. A trolley wire detection device, wherein a trolley wire is disposed on a guide rail and is disposed along an extending direction of the guide rail, and the trolley wire detection device comprises:

a current collector assembly connected to the trolley wire;

a power mechanism slidably disposed on the guide rail; and an engagement assembly disposed between the current collector assembly and the power mechanism, wherein the engagement assembly is configured to provide a predetermined threshold connection force, so that the current collector assembly is connected to the power mechanism;

wherein the power mechanism is configured to drive the current collector assembly to move along the trolley wire through the engagement assembly, and the current collector assembly is configured to be disengaged from the power mechanism when a mechanical resistance exerted by the trolley wire on the currently collector assembly is greater than the predetermined threshold connection force.

2. The trolley wire detection device according to claim 1, wherein the power mechanism comprises:

a mounting seat; and driving wheels disposed on the mounting seat, the driving wheels in contact with the guide rail and configured to roll along the guide rail to drive the mounting seat to move along the guide rail;

wherein inner side refers to a side facing an interior cavity of the guide rail, and outer side refers to a side opposite the interior cavity.

3. The trolley wire detection device according to claim 2, wherein the power mechanism further comprises driven wheels, the driven wheels are disposed on the mounting seat, and the driven wheels are in contact with the guide rail, and are driven by the mounting seat to roll along the guide rail.

4. The trolley wire detection device according to claim 3, wherein the driving wheels are disposed on an outer side of the guide rail, the driven wheels are disposed on an inner side of the guide rail, and the driven wheels and the driving wheels are configured to cooperate to clamp the guide rail.

5. The trolley wire detection device according to claim 3, wherein the guide rail comprises a top wall, the driving wheels are disposed on an outer side of the top wall, and the driven wheels are disposed on an inner side of the top wall.

6. The trolley wire detection device according to claim 3, wherein the mounting seat comprises:

a first mounting member located on an outer side of the guide rail, the driving wheels being disposed on the first mounting member;

a second mounting member, comprising a first part located on the outer side of the guide rail, and a second part located on an inner side of the guide rail, the driven wheels being disposed on the second part; and a connecting assembly connected to the first mounting member and the first part, the connecting assembly being configured to adjust a gap between the first mounting member and the first part.

7. The trolley wire detection device according to claim 6, wherein the connecting assembly comprises:

screw rods, first ends thereof being threadedly connected to the first part, and second ends thereof penetrating the first mounting member;

springs sleeving the second ends of the screw rods; and nuts threadedly connected to the second ends of the screw rods to compress the springs between the nuts and the first mounting member.

8. The trolley wire detection device according to claim 2, wherein the power mechanism further comprises guide wheels, and the guide wheels are disposed on the mounting seat, are in contact with the guide rail, and are driven by the mounting seat to roll along the guide rail.

9. The trolley wire detection device according to claim 8, wherein the guide wheels comprise:

first guide wheels disposed on the inner side of the guide rail; and second guide wheels disposed on the outer side of the guide rail; the second guide wheels and the first guide wheels being configured to cooperate to clamp the guide rail.

10. The trolley wire detection device according to claim 9, wherein the driving wheels comprise a first driving wheel and a second driving wheel; two first guide wheels are disposed, and two second guide wheels are disposed; a central axis of the first driving wheel is perpendicular to and coplanar with a central axis of one of the first guide wheels; a central axis of the second driving wheel is perpendicular to and coplanar with a central axis of the other first guide wheel; and the two first guide wheels and the two second guide wheels are located in the same plane.

11. The trolley wire detection device according to claim 9, wherein the guide rail comprises a top wall and a side wall connected to the top wall, the power mechanism further comprises driven wheels, the driven wheels are disposed on the mounting seat, and the driven wheels are in contact with the guide rail, and are driven by the mounting seat to roll along the guide rail; the driving wheels and the driven wheels are configured to clamp the top wall of the guide rail, and the first guide wheels and the second guide wheels are configured to clamp the side wall of the guide rail.

12. The trolley wire detection device according to claim 8, wherein axes of the guide wheels are perpendicular to axes of the driving wheels.

13. The trolley wire detection device according to claim 1, wherein the engagement assembly comprises magnetic assemblies which are attracted to each other and disposed on the current collector assembly and the power mechanism, or comprises elastic snap-fit assemblies which are connected to each other in a snap-fit manner and disposed on the current collector assembly and the power mechanism.

14. The trolley wire detection device according to claim 1, wherein the current collector assembly comprises a current collector body and a connecting member, the connecting member is connected to the current collector body, and the connecting member is also connected to the power mechanism through the engagement assembly.

15. A trolley wire detection system, comprising: a trolley wire; a guide rail; and the trolley wire detection device according to claim 1; wherein the trolley wire is disposed on the guide rail and extends along a lengthwise direction of the guide rail.

\* \* \* \* \*